United States Patent [19]

Preston et al.

[11] 4,010,211

[45] Mar. 1, 1977

[54] STABILIZATION OF POLYETHER POLYOLS

[75] Inventors: Frank J. Preston, Meriden; Peter P. Priga, Oxford, both of Conn.

[73] Assignee: Olin Corporation, New Haven, Conn.

[22] Filed: May 12, 1975

[21] Appl. No.: 576,839

[52] U.S. Cl. .................. 260/611.5; 260/2.5 BB; 260/2.5 A; 260/45.8 R; 260/77.5 SS

[51] Int. Cl.² .................................. C07C 41/12

[58] Field of Search .................. 260/611.5

[56] References Cited

UNITED STATES PATENTS

| | | | |
|---|---|---|---|
| 2,786,080 | 3/1957 | Patton | 260/611.5 |
| 3,214,397 | 10/1965 | Cox | 260/2.5 |
| 3,437,694 | 4/1969 | Austin | 260/611.5 |
| 3,468,842 | 9/1969 | Mollico et al. | 260/45.8 |
| 3,494,880 | 2/1970 | Austin | 260/2.5 |
| 3,567,664 | 3/1971 | Haring | 260/2.5 |
| 3,637,865 | 1/1972 | Haring | 260/611.5 |

*Primary Examiner*—Bernard Helfin
*Attorney, Agent, or Firm*—F. A. Iskander; Thomas P. O'Day

[57] ABSTRACT

Polyether polyols and polyurethane foams are stabilized by the inclusion therein of a mixture of 2,6-di-tertiarybutyl-4-methyl phenol, a disubstituted diphenyl amine, and a select phenothiazine compound.

6 Claims, No Drawings

STABILIZATION OF POLYETHER POLYOLS

This invention relates to the stabilization of polyether polyols and polyurethane foams.

The polyether polyols have been used extensively in the preparation of polyurethane foam. It is now well-known that under certain conditions these polyether polyols are subject to oxidation, the effect of which is to cause discoloration and reduction in polyol reactivity. It is also known that a frequently encountered problem in the preparation of polyurethane foam is the phenomenon of foam scorching. This phenomenon, which may occur in the course of the foam-forming reaction or as a result of the foam being exposed to elevated temperatures, has the practical effect of discoloring or materially degrading the physical properties of the foam.

To alleviate the problems of polyether polyol oxidation and polyurethane foam scorching, numerous stabilizers have been suggested by the prior art. These include, for example, phenothiazine, the mono- and dialkylphenothiazines, 2,6-di-tertiary-butyl-4methyl phenol, p,p'-dioctyl diphenyl amine and so forth. See for instance U.S. Pat. Nos. 2,786,080, 3,214,397, 3,468,842, 3,437,694 and 3,494,880.

A particularly effective stabilizer composition which has been successfully used in the industry is that described in U.S. Pat. Nos. 3,637,865 and 3,567,664. It consists of a mixture of 2,6-di-tertiarybutyl-4-methyl phenol and a disubstituted diphenyl amine. These two compounds, when combined together, have been found to exert a pronounced synergistic oxidation and scorch inhibiting effect. Consequently, mixtures of the phenol and the amine, inasmuch as they provide a highly efficient and economically attractive solution to the problem of polyether polyol instability and polyurethane foam scorching, have been favored for use over other stabilizer systems.

However, during recent years the cost of the 2,6-di-tertiarybutyl-4-methyl phenol has increased owing mainly to a relatively limited supply of this material coupled with increasing demand and consumption. Thus a need exists in the art for a more economical and more effective stabilizer system.

In accordance with the present invention, an improvement has been found for reducing the level of the 2,6-di-tertiarybutyl-4-methyl phenol (hereinafter referred as "butylated hydroxy toluene" or "BHT") in prior art stabilizing compositions containing this material. The improvement is based on the discovery of a partial replacement for the butylated hydroxy toluene. More specifically, it has been found that stabilization of polyether polyols and polyurethane foams can be achieved, using reduced levels of the butylated hydroxy toluene in the prior art stabilizing mixture referred to above, by the addition of a third component. This third component is a select phenothiazine compound as described in more detail hereinbelow. The phenothiazine compound, when incorporated in the two-component stabilizing mixture described above, reduces the level of the butylated hydroxy toluene that is required and improves the stability of polyether polyols and polyurethane foams.

Pursuant to the invention, polyether polyols and polyurethane foams are stabilized by including therein a three-component composition made up of butylated hydroxy toluene, a disubstituted diphenyl amine and a phenothiazine compound represented by the formula:

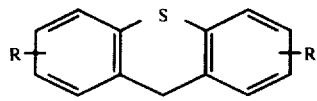

in which each R is independently hydrogen or alkyl of 1–12 carbon atoms.

Any phenothiazine compound or mixture thereof as represented by formula I above may be employed. This includes phenothiazine, a monoalkyl phenothiazine, a dialkyl phenothiazine and mixtures thereof. The alkyl group in the mono- and dialkylphenothiazine, i.e., the radical R, contains 1–12 as noted above. Illustrative such radicals include methyl, ethyl, propyl, butyl, pentyl, hexyl, octyl, dodecyl, and so forth. It is to be noted, furthermore, that the position of each alkyl group on each of the two aromatic rings in the phenothiazine is not critical. Thus as indicated in formula I above, each of the two alkyl groups can be present on any of the available positions in the two aromatic rings.

Illustrative mono- and dialkylphenothiazines as represented by formula I include 2-methylphenothiazine; 3-octylphenothiazine; 2,8-dimethylphenothiazine; 3,7-dimethylphenothiazine; 3,7-diethylphenothiazine; 3,7-dibutylphenothiazine; 3,7-dioctylphenothiazine; 2,8-dioctylphenothiazine; mixtures thereof and the like. In the case of the dialkylphenothiazines, it is generally preferred to employ those in which the two alkyl groups are identical. The compound 3,7-dioctylphenothiazine is especially preferred for use according to the invention because it is a readily available commercial product.

In utilizing a phenothiazine compound of formula I according to the invention, any suitable proportion may be used which is effective in reducing the level of butylated hydroxy toluene that is required and/or in improving the stability of polyether polyols and polyurethane foams. For example from about 10 to about 2,000, and preferably about 20–1,200, parts of the phenothiazine compound can be employed per every one million part by weight of the polyether polyol as stabilized according to the invention or as used in making stabilized polyurethane foam. In accordance with the most preferred embodiments of the invention, a proportion of about 25–600 parts per million parts by weight of the polyether polyol is employed.

Except for the addition of the phenothiazine compound as described above, the stabilization of polyether polyols and polyurethane foams is achieved in accordance with the teachings of the prior art. See for example the above noted U.S. Pat. Nos. 3,567,664 and 3,637,856, both of which issued to R. C. Haring. The entire disclosure of both of these two Haring patents are incorporated herein by reference.

Pursuant to the prior art referred to above, a stabilizing mixture of butylated hydroxy toluene and a disubstituted diphenyl amine is used. The disubstituted diphenyl amine can be any such compound, a mixture of which with the butylated hydroxy toluene exhibits a synergistic stabilizing effect in polyols and polyurethane foams. Such disubstituted diphenyl amines include the p,p'-dialkyl diphenyl amines and the p,p'-di-α-alkylstyryl diphenyl amines. The alkyl moieties in the latter two groups of compounds may be alike or different, and each alkyl group contains 1-18 carbon atoms. However, it is particularly preferred to employ as the disubstituted diphenyl amine p,p'-di-α-methylstyryl diphenyl amine; a p,p'-dialkyl diphenyl amine in which the alkyl moieties contain 6-12 carbon atoms; or a mixture of such amines. Illustrative of the preferred p,p'-dialkyl diphenyl amines are p,p'-dipropyl diphenyl amine; p,p'-dibutyl diphenyl amine; p,p'-diamyl diphenyl amine; p,p'-dioctyl diphenyl amine; p-octyl-p'-dodecyl diphenyl amine; and p,p'-didodecyl diphenyl amine. The most preferred disubstituted diphenyl amines are p,p'-di-α-methylstyryl diphenyl amine and p,p'-dioctyl diphenyl amine.

Further according to the prior art, the mixture of butylated hydroxy toluene and disubstituted diphenyl amine is employed in a proportion of about 100 to about 50,000 parts per every one million parts by weight of the polyether polyol which is stabilized or which is used in making stable polyurethane foam. A preferred range of proportions is about 500-10,000, and still more preferably about 1,500-5,000 parts of the mixture per million parts by weight of the polyether polyol. In addition, about 15 to about 90, and preferably about 25-85, percent by weight of the mixture is disubstituted diphenyl amine; and correspondingly about 85-10, and preferably about 75-15, percent of the mixture is butylated hydroxy toluene.

Any polyether polyol may be stabilized by the method of the invention. This includes polyols which are the products of reacting alkylene oxide with polyhydric alcohols. These products and their preparation are well known in the art. Thus suitable alkylene oxides for use in preparing these products include those having a 1,2-epoxide ring and 2-8 carbon atoms. Illustrative such alkylene oxides include, for example, ethylene oxide, propylene oxide, butylene oxide, cyclohexane oxide, glycidol, and the halogenated alkylene oxides such as 4,4,4-trichloro-1,2-epoxybutane. A single such oxide or a mixture thereof may be used in preparing the polyether polyols. Where a mixture of oxides is used, random and/or step-wise addition techniques may be employed, so that the product polyether polyol may be a random and/or block polyether. The preferred alkylene oxides for use in preparing the polyether polyol are those having 2-4 carbon atoms such as ethylene oxide, propylene oxide, butylene oxide and mixtures thereof.

The polyhydric alcohols employed in preparing the polyether polyols may contain from 2 to 8 hydroxy groups. They include for example aliphatic polyhydroxy alcohols, cycloaliphatic polyhydroxy compounds and mixtures thereof. The aliphatic polyhydroxy alcohols usually contain 2-8 carbon atoms and they are exemplified by ethylene glycol; propylene glycol; diethylene glycol; 2,3-butylene glycol; 1,3-butylene glycol; 1,5-pentane diol; glycerol; trimethylolpropane; triethylolpropane, sorbitol; pentaerythritol and mixtures thereof. The cycloaliphatic polyhydroxy compounds are exemplified by starch, glucose, methyl glucoside, sucrose, and the like. Generally speaking, the preferred alcohols for use in preparing the polyether polyols which are stabilized according to the invention are the aliphatic diols and triols, as illustrated above, and mixtures thereof.

In preparing the polyether polyols, conventional techniques and catalysts are used to bring about the reaction of the alkylene oxides with the polyhydric alcohols. For example, the reaction may be carried out in the presence of an alkaline catalyst such as KOH and with moderate heating. A sufficient proportion of alkylene oxide, or mixture of alkylene oxides, is used to achieve in the polyether product a molecular weight ranging from about 200 to about 10,000 and preferably about 250-8,000.

The polyurethane foams which are stabilized according to the invention are prepared by conventional methods using any suitable combination of polyether polyols, as described above, organic polyisocyanates, foaming agents, reaction catalysts and other ingredients which are suitable or desirable for use in foam production. Such foams can be of the flexible, semi-rigid or rigid variety, and they can be prepared using the one-shot method or the prepolymer technique. Generally, the stabilizing composition of the invention is particularly adapted for the stabilization of flexible polyurethane foams.

Any suitable organic isocyanate which is capable of reacting with a polyether polyol to form a polyurethane may be employed in preparing the foam. This includes diisocyanates and polyisocyanates, e.g., triisocyanates and polymeric isocyanates. Due to their commercial availability the polymeric isocyanates and tolylene diisocyanate are preferred. The latter, the use of which is most preferred, may be supplied in the form of an isomeric mixture such as the commonly used mixture of about 80 percent by weight of 2,4-isomer and about 20 percent of the 2,6-isomer. Other typical isocyanates include, but are not limited to, the following: 4,4'-methylene-bis(phenylisocyanate), 3,3'-bitolylene-4,4'-diisocyanate, 3,3'-dimethoxy-biphenylene-4,4'-diisocyanate, naphthalene-1,5-diisocyanate, hexamethylene diisocyanate, 1,4-phenylene diisocyanate, polyphenylene polymethylene isocyanate, etc. The amount of isocyanate employed in the preparation of the polyurethane foams should be sufficient to provide at least about 0.7 NCO groups per hydroxyl group present in the reaction system. An excess of isocyanate compound may be conveniently employed; however, the use of a large excess is generally undesirable due to the high cost of the isocyanate compounds. It is preferable, therefore, to employ no greater than about 1.5 NCO groups per hydroxyl group, and still more preferably from about 0.9 to about 1.3 NCO groups per hydroxyl group.

In preparing the polyurethane foams, the polyether polyol is reacted with the organic isocyanate in the presence of a foaming agent and a reaction catalyst. The foaming agent may be any one of those known to be useful for this purpose, such as water, which is preferred, the halogenated hydrocarbons, and mixtures thereof. Typical halogenated hydrocarbons include, but are not limited to, the following: monofluorotrichloromethane, difluorodichloromethane, 1,1,2-trichloro1,2,2-trifluoroethane, methylene chloride, chloroform, and carbon tetrachloride. The amount of foaming agent employed may be varied within a wide range. Generally, however, the halogenated hydrocarbons are employed in an amount from 1 to 50 parts by weight per 100 parts by weight of the polyether polyol, and generally water is employed in an amount of from 0.1 to 10 parts by weight per 100 parts by weight of the polyether polyol.

The catalyst used in preparing the polyurethane foams may be any one of those known to be useful for this purpose, or mixture thereof, including tertiary amines and metallic salts. Typical tertiary amines include, but are not limited to, the following: N-methyl morpholine, N-hydroxyethyl morpholine, triethylene diamine, dimethyl ethanolamine, tetramethylbutane diamine, triethylamine and trimethylamine. Typical metallic salts include, for example, the salts of antimony, tin and iron, e.g., dibutyltin dilaurate, stannous octoate, etc. Generally speaking, the catalyst is employed in an amount from 0.1 to 2.0 percent by weight of the polyether polyol.

It is preferred in the preparation of the polyurethane foams of the present invention to employ minor amounts of a surfactant in order to improve the cell structure of the polyurethane foams. Typical of such surfactants are the silicon-based surfactants as disclosed for example in U.S. Pat. No. 2,834,748, issued May 13, 1958, to Donald L. Bailey et al and in the book "Rigid Plastics Foams" by T. H. Ferrigno (1963), Reinhold Publishing Company, especially pages 40–42. Other suitable compounds useful as surfactants include synthetic detergents such as oxyethylated nonyl phenol and other ethylene oxide and glycidolbased surfactants. Generally up to 2 parts by weight of the surfactant is employed per 100 parts of polyether polyol.

Various additives may also be employed in preparing the foam which serve to provide different properties, e.g., fillers such as clay, calcium sulfate, barium sulfate, or ammonium phosphate may be added to lower cost and improve physical properties. Ingredients such as dyes may be added for color, and fibrous glass, asbestos, or synthetic fibers may be added for strength. In addition, plasticizers and deodorants may be added.

In practicing the method of the invention for improving the stability of polyether polyols, the phenothiazine compound, the butylated hydroxy toluene and the disubstituted diphenyl amine are simply added to the polyol and mixed therewith. Each of the three components may be added separately or they may be preparatorily mixed together before being added to the polyether polyol.

As indicated above, the proportion of the stabilizing composition of the invention which is used to stabilize the polyol is adequate for stabilizing polyurethane foams which are derived from such polyols. Thus the foams are stabilized by including in the foam forming reaction mixture the above-indicated proportions of stabilizer per one million parts by weight of polyol reactant. This again is achieved by separately adding the components of the stabilizing composition to the foam-forming mixture. Alternatively, and in accordance with the preferred embodiments of the invention, the stabilizing composition is preparatorily blended into the polyol reactant before the latter is used in making the foam.

Pursuant to an especially favored embodiment of the invention, polyether polyols and polyurethane foams derived therefrom are stabilized using the above-described three components of the stabilizing composition of the invention in the following proportions per every one million parts by weight of the polyether polyol:

1. about 600–2,500, and preferably about 750–1,800, parts by weight of the butylated hydroxy toluene;
2. about 400–1,800, and preferably about 800–1,600, parts by weight of the disubstituted diphenyl amine; and
3. about 25–600, and preferably about 40–500, parts by weight of the phenothiazine compound.

The utilization of the stabilizing composition of the invention has two main advantages. First, by reducing the level of butylated hydroxy toluene which would otherwise be required, it provides a more economical expedient for the stabilization of polyether polyols and polyurethane foams. Secondly, it has been found that the stabilizing composition of the invention is more efficient and yields a higher level of stabilization than obtains from the use of the prior art stabilizer mixture in the absence of the phenothiazine compound.

Polyether polyols which are stabilized according to the invention are useful as heat transfer fluids, surface active reagents, hydraulic fluids, and in the preparation of polyurethane foams. The latter, which are also stabilized according to the invention, are in turn utilized in a variety of cushioning and insulating applications.

The following examples are provided to illustrate the invention. In these examples, all parts and percentages are by weight unless otherwise specified.

EXAMPLES 1–7

A sample of oxypropylated glycerin having a molecular weight of 3,000 was divided into seven portions identified as E-1 through E-7. Each portion was blended with a stabilizing mixture of butylated hydroxy toluene, p,p'-dioctyl diphenyl amine and 3,7-dioctylphenothiazine. The composition of the mixture, as used to stabilize each portion, is set forth in Table I below.

After blending portions E-1 through E-7 with the stabilizing mixture, each portion was placed in a Perkin-Elmer differential scanning calorimeter, Model DSC-1, to determine the temperature of transition, $T_t$ (which is the temperature of the initiation of oxidative decomposition) of the resulting stabilized polyether polyol. In the operation of this apparatus the sample to be tested was placed in an aluminum cup and heated along with a reference cup at a programmed rate (approximately 20° C per minute) and the power necessary to keep both the sample and the reference material at a programmed temperature was recorded on the Y axis of the time-base recorder. At a transition of the sample the power difference supplied to each sample due to absorption or emission of energy by the sample was noted by a deflection in the recorder. The transition temperature was usually determined by locating the point of interception of the base line and the slope of the deflection. The higher the transition temperature of the sample, the more stable was the sample. The results are given in Table I below in which "BHT" stands for butylated hydroxy toluene, "DDA" stands for p,p'-dioctyl diphenyl amine and "DOP" stands for 3,7-dioctyl phenothiazine. The proportion of each stabilizer component given in Table I represents parts per million parts by weight of the oxypropylated glycerin.

Table I

| Portions | BHT | DDA | DOP | Trans. Temp. (° C) |
|---|---|---|---|---|
| E-1 | 1250 | 1000 | 320 | 222 |
| E-2 | 1000 | 1200 | 320 | 226 |
| E-3 | 1250 | 827 | 324 | 213 |
| E-4 | 1006 | 1010 | 206 | 225 |
| E-5 | 2000 | 499 | 205 | 223 |
| E-6 | 1000 | 502 | 250 | 213 |
| E-7 | 1000 | 497 | 207 | 208 |

EXAMPLES 8-15

Following the general procedure of Example 1, another sample of oxypropylated glycerin, molecular weight 3,000, was divided into 20 portions. Eight of these portions, identified as E-8 through E-15, were used to further illustrate the invention. The remaining twelve portions were used for comparison purposes, these portions being identified as portions A-L. Each of the 20 portions was blended with a stabilizing mixture as detailed in Table II below. The transition temperature for each portion was determined following the procedure of Example 1, and the results are given in Table II in which the column heading P stands for phenothiazine.

Table II

| Portion | BHT | DDA | P | DOP | Trans. Temp. (° C) |
|---|---|---|---|---|---|
| E-8 | 2000 | 1003 | 58 | — | 222 |
| A | 2058 | 1003 | — | — | 209.2 |
| B | 2000 | 1061 | — | — | 211.7 |
| E-9 | 650 | 1200 | — | 320 | 221 |
| C | 970 | 1200 | — | — | 205.2 |
| D | 650 | 1520 | — | — | 204.8 |
| E-10 | 1250 | 1200 | — | 100 | 209 |
| E | 1350 | 1200 | — | — | 207.6 |
| F | 1250 | 1300 | — | — | 209.6 |
| E-11 | 5000 | 600 | 80 | — | 222.7 |
| E-12 | 5000 | 600 | — | 80 | 224.9 |
| G | 5080 | 600 | — | — | 213.8 |
| H | 5000 | 680 | — | — | 215.7 |
| E-13 | 500 | 5000 | 80 | — | 222.2 |
| E-14 | 500 | 5000 | — | 80 | 220.2 |
| I | 580 | 5000 | — | — | 213.7 |
| J | 500 | 5080 | — | — | 211.8 |
| E-15 | 1000 | 1000 | 54 | — | 214 |
| K | 1054 | 1000 | — | — | 174.7 |
| L | 1000 | 1054 | — | — | 202.8 |

The data provided in Table II above demonstrates the efficacy of phenothiazine and dioctyl phenothiazine as a stabilizer in combination with butylated hydroxy toluene and p,p'-dioctyl diphenyl amine. It is to be noted, by comparing the data on portions A-L with that on portions E-8 through E-15, that the partial substitution of the phenothiazine or dioctyl phenothiazine for the butylated hydroxy toluene in all cases results in improving the polyol stability. For example, compare the data on portion E-8 with that on portion A. In portion E-8, a stabilizer containing 58 parts of phenothiazine was used and a transition temperature of 222° C was observed; whereas portion A where, no phenothiazine was used and the proportion of butylated hydroxy toluene was 58 parts more than used in E-8, had a lower transition temperature of 209.2° C.

EXAMPLE 16

A flexible polyurethane foam was prepared from a reaction mixture consisting of the following ingredients in the indicated proportions:

| Ingredients | Parts by Weight |
|---|---|
| Oxypropylated glycerin, mol. wt. 3,000 | 100 |
| Tolylene diisocyanate (80/20 mixture of 2,4-/2,6-isomers) | 54.6 |
| Water | 4.5 |
| Triethylene diamine catalyst | 0.34 |
| Silicone surfactant* | 1.52 |
| Stabilizer composition | |
| a) butylated hydroxy toluene | 0.125 |
| b) p,p'-dioctyl diphenyl amine | 0.120 |
| c) 3,7-dioctylphenothiazine | 0.025 |

*This surfactant is a commercial product of Dow Corning supplied under the trademark "Dow Corning 190".

The above ingredients were mixed thoroughly and foamed in a closed polyethylene bag. After the foam was cured, the foam was cut vertically in half and examined for any scorching. No scorching was observed, the interior of the foam being found all uniform in cellular structure and color (white).

For comparison purposes, the above procedure was repeated except that no stabilizing composition was used in making the foam. As a result, a large brown region was observed in the middle of the bun indicating substantial scorching.

What is claimed is:

1. In a polyether polyol composition which is stabilized against degradation by the inclusion therein of about 500–10,000 parts per million by weight of a mixture of (1) about 15–75 percent by weight of 2,6-di-tertiarybutyl-4-methyl phenol and (2) correspondingly about 85–25 percent by weight of p,p'-dioctyl diphenyl amine, said polyether polyol having a molecular weight of about 250–8,000 and being the product of reacting a polyhydric alcohol having 2–8 hydroxy groups with an alkylene oxide having a 1,2-epoxide ring and selected from the group consisting of ethylene oxide, propylene oxide, butylene oxide and a mixture thereof, the improvement of including in said composition, as a partial replacement for said 2,6-di-tertiarybutyl-4-methyl phenol, about 25–600 parts, per million parts by weight of said polyether polyol, of a phenothiazine compound represented by the formula:

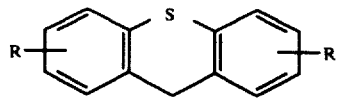

in which each R is independently hydrogen or alkyl of 1–12 carbon atoms.

2. The composition of claim 1 wherein said phenothiazine compound is selected from the group consisting of phenothiazine, 2-methylphenothiazine; 3-octyl-phenothiazine; 2,8-dimethylphenothiazine; 3,7-dimethylphenothiazine; 3,7-diethylphenothiazine; 3,7-dibutylphenothiazine; 3,7-dioctylphenothiazine; 2,8-dioctylphenothiazine and a mixture thereof.

3. The composition of claim 1 wherein phenothiazine or 3,7-dioctylphenothiazine is employed as the phenothiazine compound.

4. The composition of claim 2 wherein said polyhydric alcohol is an aliphatic diol, an aliphatic triol or a mixture thereof.

5. A composition as claimed in claim 4 which comprises, per every million parts by weight of said polyether polyol, (1) about 600–2,500 parts by weight of said 2,6-di-tertiarybutyl-4-methyl phenol, (2) about 400–1,800 parts by weight of said p,p'-dioctyl diphenyl amine, and (3) about 25–600 parts by weight of said phenothiazine compound.

6. The composition of claim 5 wherein said phenothiazine compound is 3,7-dioctylphenothiazine.

* * * * *